(12) United States Patent
Polcuch

(10) Patent No.: US 9,190,942 B2
(45) Date of Patent: Nov. 17, 2015

(54) NEAR SYNCHRONOUS CONTROLLED INDUCTION MOTOR DRIVE ACTUATION SYSTEM

(75) Inventor: Eric A. Polcuch, Mission Viejo, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 197 days.

(21) Appl. No.: 13/187,726

(22) Filed: Jul. 21, 2011

(65) Prior Publication Data

US 2012/0018578 A1    Jan. 26, 2012

Related U.S. Application Data

(60) Provisional application No. 61/366,705, filed on Jul. 22, 2010.

(51) Int. Cl.
| | | |
|---|---|---|
| *B64C 13/28* | (2006.01) | |
| *H02P 8/40* | (2006.01) | |
| *B64C 13/50* | (2006.01) | |

(52) U.S. Cl.
CPC .. *H02P 8/40* (2013.01); *B64C 13/50* (2013.01)

(58) Field of Classification Search
CPC ....................................................... B64C 13/28
USPC ........................................ 244/99.2, 227, 228
See application file for complete search history.

(56) References Cited

U.S. PATENT DOCUMENTS

| | | | |
|---|---|---|---|
| 2,772,059 A | 11/1956 | Noxon et al. | |
| 2,774,559 A | 12/1956 | MacCallum | |
| 2,776,807 A | 1/1957 | Noxon et al. | |
| 2,873,418 A | 2/1959 | Owen | |
| 2,875,964 A | 3/1959 | Jarvis | |
| 2,929,584 A | 3/1960 | Barlow et al. | |
| 2,950,075 A | 8/1960 | Owen | |
| 2,957,652 A | 10/1960 | Masel | |
| 3,082,978 A | 3/1963 | Smith et al. | |
| 3,104,083 A | 9/1963 | Kutzler | |
| 3,171,616 A | 3/1965 | Forsberg et al. | |
| 7,185,854 B2 | 3/2007 | Von Thal et al. | |
| 7,556,224 B2 * | 7/2009 | Johnson et al. | ............... 244/175 |
| 8,276,842 B2 * | 10/2012 | Kracke | ........................ 244/99.4 |
| 2005/0029407 A1 * | 2/2005 | Pohl et al. | ..................... 244/221 |

(Continued)

OTHER PUBLICATIONS

Anonymous: "Linear Actuators", Internet Citation. 2000, Retrieved from the Internet: http://www.mpcproducts.com/linear.asp.

(Continued)

*Primary Examiner* — Timothy D Collins
*Assistant Examiner* — Keith L Dixon
(74) *Attorney, Agent, or Firm* — Renner, Otto, Boisselle & Sklar, LLP.

(57) ABSTRACT

A distributed electromechanical actuation system including multiple electromechanical actuators intended to operate together in a synchronous (or near synchronous) manner. Each individual actuator is powered by one or more induction motors or other appropriate motor such as a stepper motor. The induction motors are designed to have a very high pullout torque with very low slippage to the pull out point. The group of actuators is controlled from a single controller (e.g., an induction motor controller) that utilizes a Volts per Hertz type of open loop control where the bus voltage and frequency are controlled to assure that the motors always operate on the low slip side of the pull out point performance curve.

20 Claims, 5 Drawing Sheets

(56) References Cited

U.S. PATENT DOCUMENTS

| | | |
|---|---|---|
| 2005/0151027 A1* | 7/2005 | Recksiek et al. ............... 244/211 |
| 2007/0108343 A1* | 5/2007 | Wingett et al. ............... 244/99.3 |
| 2009/0157234 A1* | 6/2009 | Breit et al. ........................ 701/3 |
| 2010/0170999 A1 | 7/2010 | Fervel et al. |

OTHER PUBLICATIONS

Anonymous: "Lefas, Tefas, PDU High Lift Systems", Internet Citation, Retrieved from the Internet: http://www.rockwellcollins.com/sitecore/content/Data/Products/Controls/Actuators/High_Lift_Systems.aspx.

* cited by examiner

NEAR SYNCHRONOUS CONTROLLED INDUCTION MOTOR DRIVE ACTUATION SYSTEM

RELATED APPLICATION DATA

The present application claims the benefit of the filing date of U.S. Provisional Patent Application Ser. No. 61/366,705 filed Jul. 22, 2010, which is incorporated herein by reference in its entirety.

TECHNICAL FIELD

The present invention relates to an electromechanical actuation drive system requiring the synchronous (or near synchronous) operation of multiple individual actuators.

BACKGROUND

Modern thin wing aircraft designs are aimed at optimizing fuel economy. The area along the spars is getting more and more congested such that routing of mechanical drive shafts (e.g., torque tubes) between the central power drive unit (PDU) and actuators is becoming increasingly difficult.

SUMMARY

Aspects of the present invention relate to a distributed electromechanical actuation system including multiple electromechanical actuators intended to operate together in a synchronous (or near synchronous) manner when powered by one or more common electrical busses. Each individual actuator is powered by one or more induction motors or other appropriate motor such as a stepper, switched reluctance, or other type of motor. The induction motors are designed to have a very high pullout torque with very low slippage to the pull out point. The group of actuators is controlled from a single controller (e.g., an induction motor controller) that utilizes an adjustable voltage and frequency drive providing controlled alternating current (e.g., Volts per Hertz) type of open loop control where the common bus, voltage and frequency, are controlled to assure that the motors always operate on the low slip side of the pull out point of the motors torque versus speed performance range. The output of the actuators is maintained near synchronous over the applied load range within a desired slip error of the motors between a no-load and an operating point maximum load. The group of actuators is re-synchronized every retract cycle by driving into calibrated retract stops at a controlled speed and torque capability.

One aspect of the invention relates to a control system for controlling a plurality of actuators, the system including: a plurality of actuators for actuating movement of one or more adjustable components of an aircraft, wherein each actuator has a first end coupled to a structure of the aircraft and a second end coupled to one of the one or more adjustable components and each actuator additionally includes a motion control assembly that includes a drive path from a motion provider to the one adjustable component, wherein the one or more components is configured to move along a respective drive path; and an electric power controller operable to output controlled electric motor drive power information through a common bus to a plurality of the motion providers in a synchronous or near synchronous manner to actuate movement of the one or more adjustable components.

Another aspect of the invention relates to a method for controlling a plurality of actuators for actuating movement of one or more adjustable components of an aircraft, the system including: receiving a command for adjusting the one or more adjustable components; controlling a plurality of actuators for actuating movement of the one or more adjustable components of the aircraft by a electric power controller that outputs controlled electric motor drive power over a common bus in a synchronous manner to the plurality of actuators; and adjusting the one more adjustable components based on the commanded power.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

Embodiments of this invention will now be described in further detail with reference to the accompanying drawings, in which.

DETAILED DESCRIPTION OF EMBODIMENTS

Aspects of the present invention relate to a distributed electromechanical actuation system including multiple electromechanical actuators intended to operate together in a synchronous (or near synchronous) manner. Each individual actuator is powered by one or more induction motors or other appropriate motor such as a stepper, switched reluctance or other type of motor. The induction motors are designed to have a very high pullout torque with very low slippage to the pull out point, as described below. A group of actuators is controlled from a single controller (e.g., an induction motor controller) that utilizes a Volts per Hertz type of open loop control where the bus voltage and frequency are controlled to assure that the motors always operate on the low slip side of the pull out point. The output of the actuators is maintained near synchronous over the applied load range within the slip error of the motors between the no-load and the operating point maximum load. In one embodiment, the group of actuators is re-synchronized every retract cycle by driving into calibrated retract stops at a controlled speed and torque capability.

This distributed electromechanical actuation system replaces the traditional actuator and torque tube type of distributed actuation system typical on most modern aircraft high lift systems, which eliminates the need to feed the torque tubes and drive members along the wing spar. This approach also eliminates the need for multiple motor controllers and commutation circuitry and wiring associated with typical servo controlled electromechanical actuators.

With modern thin wing aircraft designs aimed at optimizing fuel economy, the area along the spars is getting more and more congested such that routing of torque tubes between the central power drive unit (PDU) and actuators is becoming increasingly difficult. Aspects of this invention eliminate the need for these torque tube routes.

Figure 1:
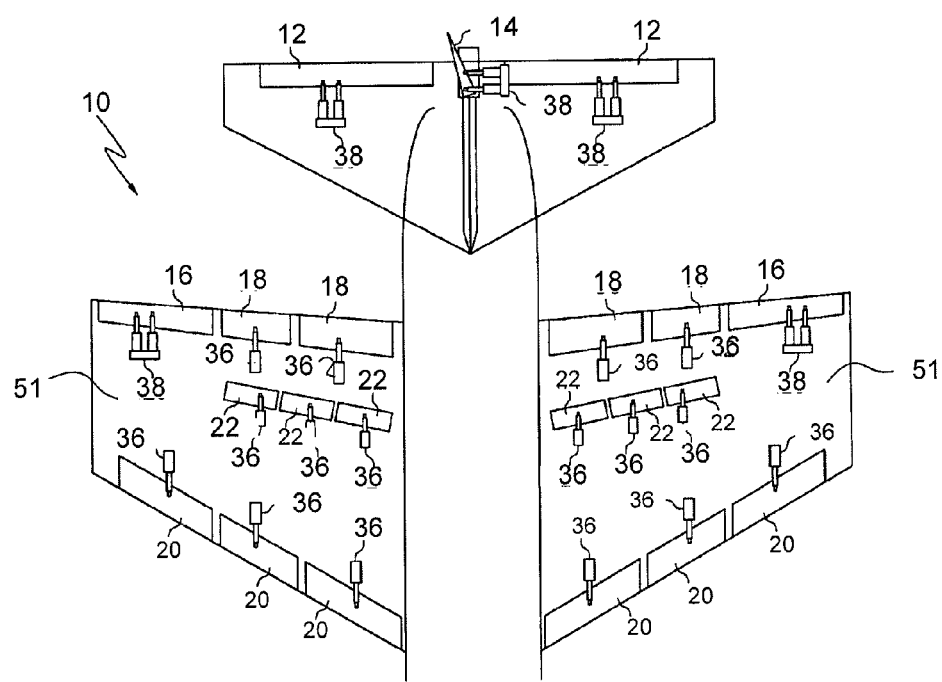
FIG. 1 is an exemplary aircraft in accordance with aspects of the present invention.

Referring now to FIG. 1, a schematic diagram of a portion of an exemplary aircraft and an exemplary flight control surface actuation system is shown. In the illustrated embodiment, the aircraft 10 includes a pair of elevators 12, a rudder 14, and a pair of ailerons 16, which are the primary flight control surfaces, and a plurality of flaps 18, slats 20, and spoilers 22, which are the secondary flight control surfaces. The primary flight control surfaces 12-16 control aircraft movements about the aircraft pitch, yaw, and roll axes. Specifically, elevators 12 are used to control aircraft movement about the pitch axis, the rudder 14 is used to control aircraft movement about the yaw axis, and the ailerons 16 control aircraft movement about the roll axis. It is noted, however, that aircraft movement about the yaw axis can also be achieved either by banking the aircraft or by varying the thrust levels from the engines on opposing sides of the aircraft 10.

The secondary control surfaces 18-22 influence the lift and drag of the aircraft 10. For example, during aircraft take-off and landing operations, when increased lift is desirable, the flaps 18 and slats 20 may be moved from retracted positions to extended positions. In the extended position, the flaps 18 increase both lift and drag, and enable the aircraft 10 to descend more steeply for a given airspeed, and also enable the aircraft 10 to get airborne over a shorter distance. The slats 20, in the extended position, increase lift and allow for higher angles of attack without aerodynamic stall of the wing, and are typically used in conjunction with the flaps 18. The spoilers 22, on the other hand, reduce lift and when moved from retracted positions to extended positions, which is typically done during aircraft landing operations, and may be used as air brakes to assist in slowing the aircraft 22.

Figure 2:
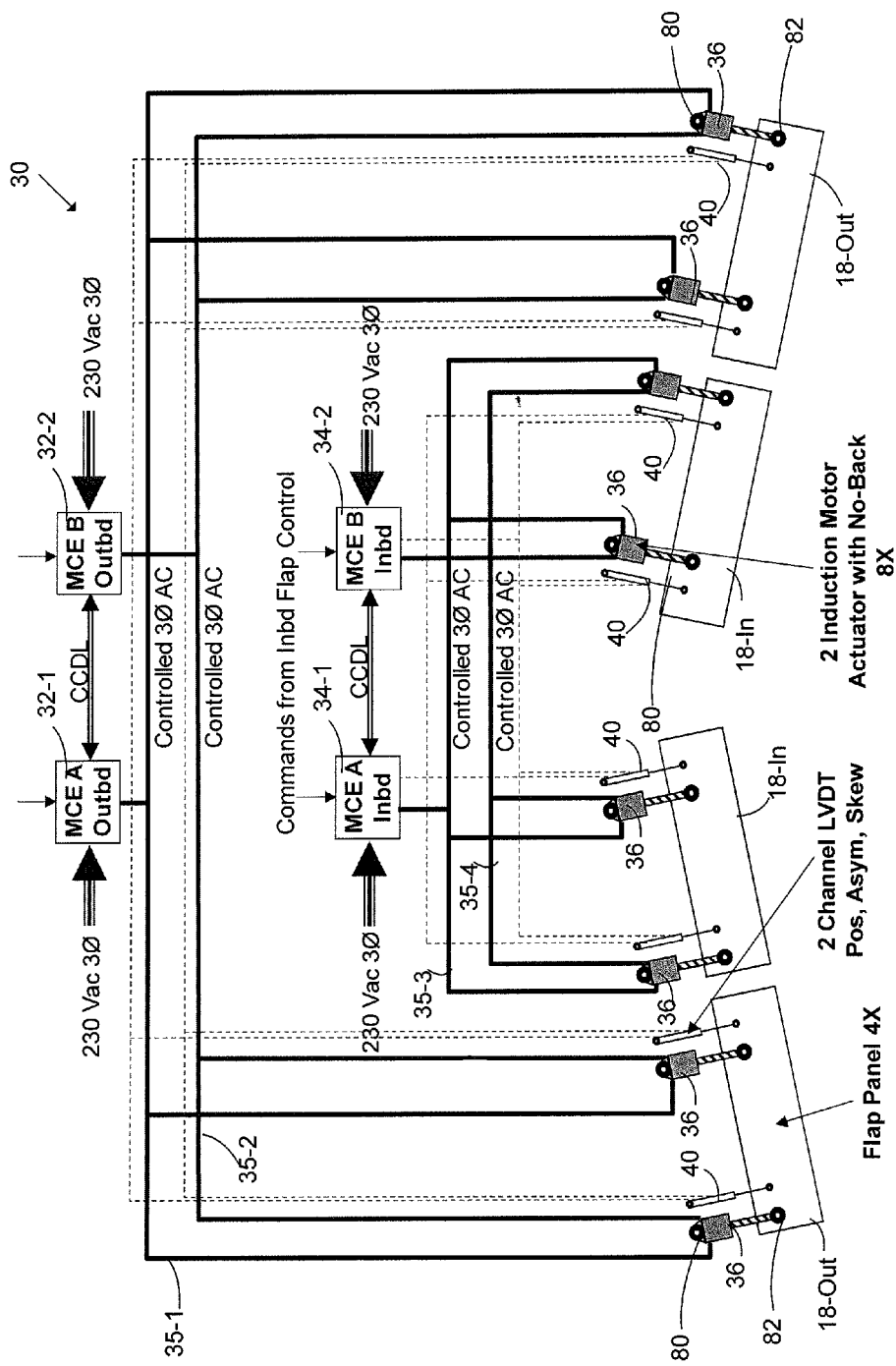
FIG. 2 is an exemplary system in accordance with aspects of the present invention.

The flight control surfaces 18-22 are moved between retracted and extended positions via a flight control surface actuation system 30, as illustrated in FIG. 2. The flight control surface actuation system 30 is exemplary in nature and not intended to limit the scope of the present invention. The flight control surface actuation system 30 includes one or more actuator controllers 32 (e.g., 32-1 and 32-2), 34 (e.g., 34-1 and 34-2) and a plurality of secondary flight control surface electromechanical actuator assemblies 36. Each actuator controller 32, 34 is configured to control operation of a plurality of flight control surfaces through one or more common busses 35 (e.g., 35-1, 35-2, 35-3, 35-4). Furthermore, it will be appreciated that the number of actuator controllers 32, 34 may vary. For simplicity purposes, the flight control surface actuation system 30 includes two multi-channel actuator controllers 32 (e.g., 32-1 and 32-2) and 34 (e.g., 34-1 and 34-2) that are operable to control more than one electromechanical actuators in synchronous and/or near synchronous manner through the common busses (e.g., 35-1, 35-2, 35-3, 35-4). As used herein, the term "synchronous" and "near synchronous" mean providing common controlled power to multiple actuators at the same time, even though the resulting performance of each actuator may account for some difference in the occurrence of an event directed by the command.

The system 30 and actuator controllers 32, 34 may be implemented according to any one of numerous operational configurations. For example, the system 30 could be configured such that one of the controllers 32-1 or 34-1 are active controllers and other controllers (e.g., 32-2 and 34-2) are in an inactive (or standby) mode, which may be used for redundancy purposes. Alternatively, the system 30 could be configured such that both controllers 32-1, 34-1 are active and controlling all, or selected ones, of the flight control surface actuator assemblies 36, 38 to which they are coupled through the common bus 35. Furthermore, while FIG. 2 illustrates a system with redundant motors and controllers other systems and variations may be used as would be appreciated by one have ordinary skill in the art. For example, a simpler simplex system of a single controller driving a single motor on each of a plurality of actuators, as well as other combinations of simplex and redundant system may be used in accordance with aspects of the present invention. No matter the specific configuration, each controller 32, 34 when active, receives flight control surface position commands from one or more non-illustrated external systems, such as a flight control computer or pilot controls, for example. In response to the flight control surface position commands, the active controllers 32-1, 34-1 supply actuator controlled motor drive power over the common bus 35 that causes the flight control surface actuator assemblies 36 to move the appropriate flight control surfaces 18-22 to the commanded flight control surface position in a synchronous and/or near synchronous manner. The controller then provides an appropriate motor drive power to drive the motors to stop the actuators at the desired position synchronously or near synchronously.

The controllers 32, 34 also receive monitor signals that are representative of flight control surface actuator assembly 36 operability. The controllers 32, 34, based on these monitor signals, determine the operability of the flight control surface actuator assemblies 36. If one or both controllers 32, 34 determine that a secondary flight control surface actuator assembly 36 is partially inoperable, it may automatically compensate, if necessary, the remaining active actuator(s) electric motor drive power to compensate for that actuator assembly 36 for the partial inoperability. It will be appreciated that the monitor signals that the controllers 32, 34 receive may be supplied directly from the flight control surface actuator assemblies 36, or from other systems and components such as, for example, linear variable differential transformer 40, which are coupled to the aircraft 10 and the flight control surface to determine a position of the flight control surface, as illustrated in FIG. 2. This position information is used by the controller to determine when to drive the actuators to stop, for example.

As further illustrated in FIG. 2, the controllers 32-1 and 32-2 are coupled to the outboard flaps 18 (e.g., 18-Out) through the common bus 35-1 and/or 35-2. The controller 32-1 may be a primary controller and controller 32-2 may be a redundant controller, for example. The controllers 32-1, 32-2 (when active), output actuator motor drive power on the corresponding bus that cause the flight control surface actuator assemblies 36 to move the appropriate flight control surface (e.g., outboard flaps 18-Out) to the commanded flight control surface in a synchronous and/or near synchronous manner. For example, the controller 32 controls operation of a plurality of control surfaces (e.g., outboard flaps 18-Out). Thus, the present system provides control of more than one control surface with a single controller through the common bus.

Likewise, the controllers 34-1 and 34-2 are coupled to the inboard flaps 18 (e.g., 18-In) through the common bus 35-3 or 35-4, for example. The controller 34-1 may be a primary controller and controller 34-2 may be a redundant controller, for example. The controllers 34-1, 34-2 (when active), output actuator controlled motor drive power that cause the flight control surface actuator assembly (e.g. assemblies 36, 38) to move the appropriate flight control surface (e.g., flaps 18) to the commanded flight control surface position in a synchronous and/or near synchronous manner.

The flight control surface actuation system 30 may also be implemented using various numbers and types of flight control surface actuator assemblies 36, 38. In addition, the number and type of flight control surface actuator assemblies 34, 38 per control surface 12-22 may be varied. In the depicted embodiment, the system 30 is configured such that a pair of electrically redundant actuator assemblies 36 are coupled to each of the secondary flight control surfaces 18-22, and a single, redundant actuator assembly 38 is coupled to each of the primary flight control surfaces 12-16. It is noted that the embodiment depicted in FIG. 1 and described above is merely exemplary, and that the flight control surface actuation system 30 could be implemented in any one of numerous alternative configurations. For example, the system 30 could be configured such that two or more non-redundant actuator assemblies 36 are coupled to each, or selected ones, of the secondary flight control surfaces 18-22, as illustrated in FIG. 2. The system 30 could also be configured such that one or more redundant actuator assemblies 38 are coupled to one or more of the secondary flight control surfaces 18-22, in addition to, or instead of, the single non-redundant actuator assemblies 36. Moreover, the system 30 could be configured such that two or more redundant actuator assemblies 38 are coupled to each, or selected ones, of the primary flight control surfaces 12-16.

Figure 3:
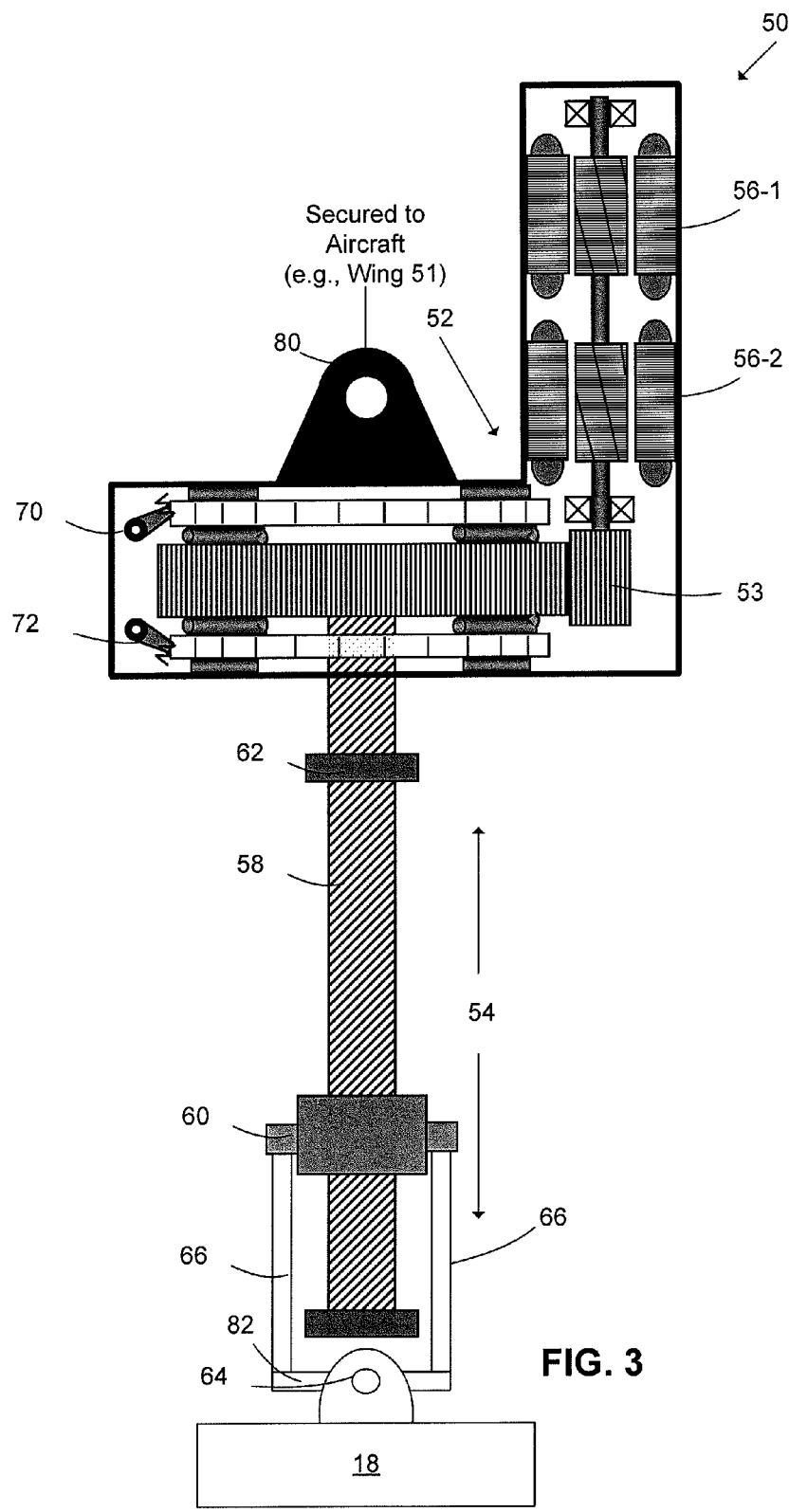
FIG. 3 is an exemplary actuator for use in the system illustrated in FIG. 2.

Aspects of this invention are directed to any number or type of actuator assemblies 36, 38 that may be used in the aircraft 10. An exemplary actuator 50 for use in accordance with aspects of the present invention is illustrated in FIG. 3. For purposes of simplicity, a single electromechanical actuator assembly 50 is illustrated.

The electromechanical actuator assembly 50 may be variously disposed. In the embodiment depicted in FIG. 3, the electromechanical actuator assembly 50 is mounted between a flap 18 and the wing 51. Of course, the electromechanical actuator assembly may be mounted to other adjustable components (e.g., elevators 12, rudder 14, ailerons 16, slats 20, and/or spoilers 22) and structures (e.g., body of aircraft 10, wing 51, tail, etc). Each actuator assembly 50 includes a control motion assembly 52 comprising a drive path 54 from a motion provider 56 (e.g., 56-1, 56-2) through the gears 53 to the component (e.g., flap 18), which facilitates controlled movement of the adjustable component. As illustrated in FIG. 2, redundant motion providers 56-1 and 56-2 may be provided.

The control motion assembly 52 comprises a motion provider 56, a screw member 58 and a nut member 60. The motion provider 56 can be, for example, a motor (or dual motors 56) (e.g., 56-1, 56-2) and associated gearing 53. Preferably, the motor provider is a three phase induction motor. A slip clutch (not shown) or other uncoupling means can be provided to prevent overloads of the control motion assembly 52. The screw member 58 is rotated by the motion provider 56 and rotation of the screw member 58 results in linear movement of the nut member 60. Alternatively, (with appropriate modifications), the nut member 60 can be rotated and the screw member 58 moved linearly in response thereto. In either or any event, the members 58/60 can incorporate low friction elements (e.g., balls or rollers) therebetween (e.g., the screw member 58 can be a ball screw or a roller screw, for example). Members 58/60 may also be sliding contact screws (e.g., Acme, buttress, square, etc.), or the actuator output could be a rotating shaft that swings an arm through an arc, for example.

In the illustrated embodiment, the actuator assembly 50 may comprise a housing 66 in which the screw member 58 rotates and in which the nut member 60 slides up/down in response to the rotation. The motion provider 56 and the housing 66 may be pivotally connected to a self-aligning member 64, which may also be pivotally connected to the component 18, for example. In this manner, the screw member 58 is fixed from axial or translation movement relative to the structure (e.g., wing 51). The nut member 60 is pivotally connected, via a link 66, to the self-aligning member 64 that is pivotally connected to the adjustable component (e.g., flap 18). The control motion providing assembly 52 thus comprises a drive path from the motion provider 56 to the adjustable component (e.g., flap 18), with particular reference to the flaps illustrated in FIGS. 1-3. The motor's rotation of the screw member 58 in one direction will pivot its leading edge upward, and the motor's rotation of the screw member 58 in the opposite direction will pivot its leading edge downward. The assembly 52 may also and/or the motion provider 56 can incorporate "no back" features 70, 72 to eliminate back-driving by aerodynamic forces, in compression 70 and/or in tension 72. A skewed roller and ratchet plate type device is shown, however, other methods to provide irreversibility of the actuator may be used in accordance with aspects of the present invention.

The motion provider 56 need not be an electric induction motor and/or the assembly 52 need not include rotational members such as screw member 58 and the nut member 60. The motion provider 56 could instead comprise electric stepper motors, switched reluctance motors, or any other similar motor that can convert controlled electric power into controlled motor rotation with the use of motor position feedback. The rotary to linear transducer 58/60 could be a rolling or sliding contact screw, a rotating shaft, or an arm that swings through an arc. Thus, transferring movement to the component (e.g., flap 18). That being said, relatively rotational members, and especially those incorporating balls or rollers, often offer higher stiffness, lighter weight, lower cost, and/or greater packaging flexibility. During normal actuator operation, the assembly 52 will control movement of the component (e.g., flap 18) through the drive path.

The actuator assembly 50 also may comprise a retract stop 62. The retract stop 62 may be coupled to the screw member 58 in such a manner that the retract stop maintains stationary with respect to the screw member. This provides a mechanism for re-synchronizing a group of actuators periodically (e.g., after every retract cycle) by driving into calibrated retract stop 62 at a controlled speed and torque capability, for example.

As discussed above, the present invention relates to distributed electromechanical actuation system for controlling operation of multiple electromechanical actuators intended to operate together in a synchronous (or near synchronous) manner over a common bus.

Referring back to FIG. 2, the architecture 30 is illustrated with respect to controlling the flaps 18 (e.g., inboard and outboard flaps of the aircraft 10). As illustrated in FIG. 2, four (4) discrete flaps 18-In and 18-Out are illustrated. Each flap includes redundant actuators (e.g., 36) and redundant linear variable differential transformers 40. The linear variable differential transformer 40 function as a position sensor. As may be appreciated, the position sensors 40 are configured to sense the position of the component, and supply a position signal representative thereof to the actuator controller. The position sensor 40 may be implemented using any one of numerous suitable position sensing devices including, for example, rotary variable differential transformers (RVDTs), linear variable differential transformers (LVDTs), potentiometers, various resistive sensors, and optical sensors, just to name a few. In the depicted embodiment, however, the position sensor 40 is implemented using an LVDT.

The actuators 36 generally are responsible for actuating movement of the adjustable component (e.g., flaps 18) with respect to a stationary portion of the aircraft 10 (e.g. wing 51). Each actuator 36 has a first end 80 coupled to a structure (e.g., body of aircraft 10, wing 51, etc.) and a second end 82 coupled to the component (e.g., flaps 18).

Each individual actuator 36 is powered by one or more induction motors 56 (e.g., 56-1, 56-2) or other appropriate motor such as a stepper or a switched reluctance motor. The induction motors 56 are designed to have a very high pullout torque with very low slip to the pull out point. The group of actuators is controlled from a single induction motor controller (e.g., 32, 34) utilizing a Volts per Hertz type of open loop control where the bus voltage and frequency are controlled to assure the motors always operate on the low slip side of the pull out point. The output of the actuators is maintained near synchronous over the applied load range within the slip error of the motors between no-load and the operating point. This is shown graphically in FIG. 4.

Figure 4:
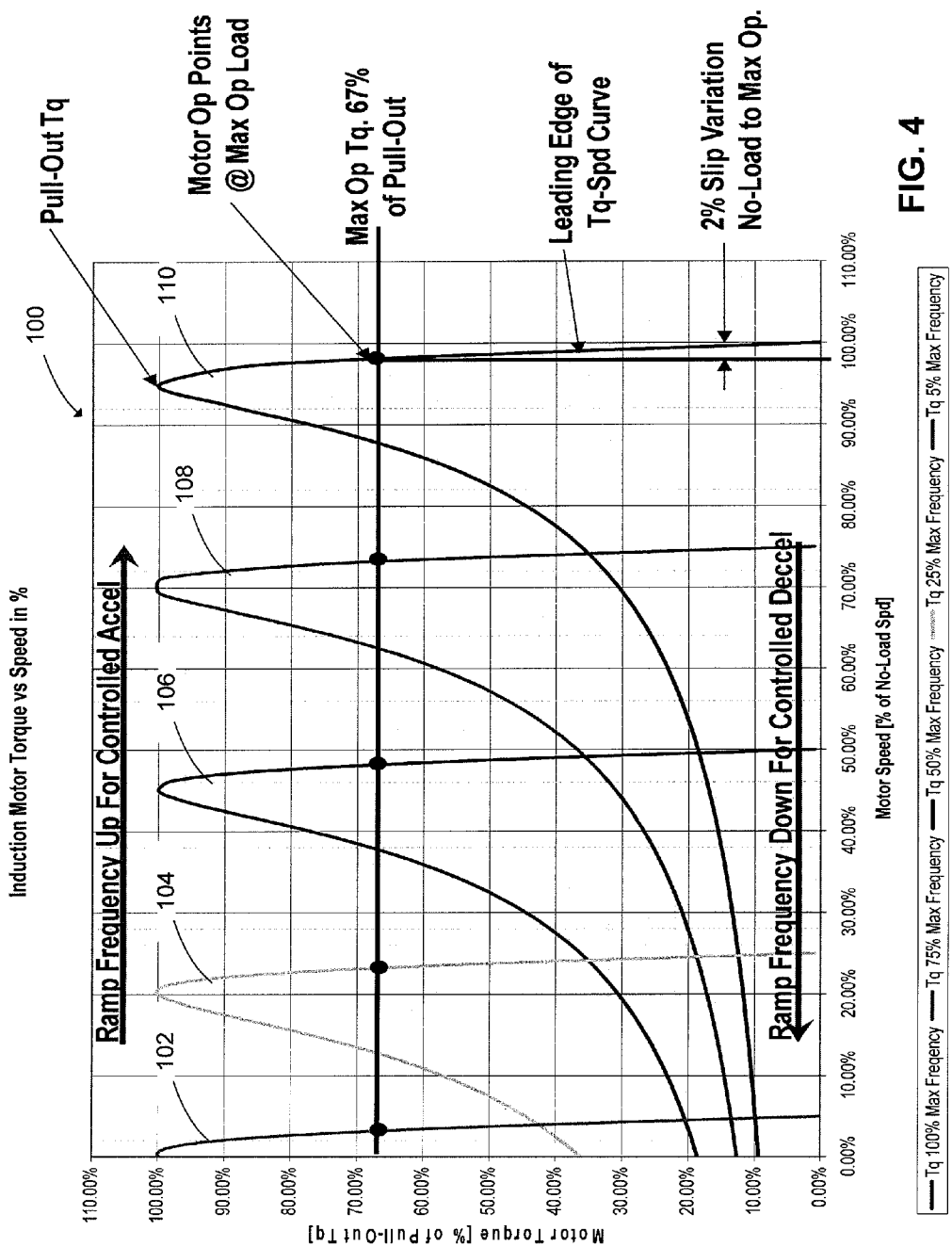
FIG. 4 is an exemplary graph illustrating induction motor performance over a range of voltages and frequencies in accordance with aspects of the present invention.

Referring to FIG. 4, generic torque versus speed plots 100 for an induction motor is illustrated at a variety of frequencies and voltages. For purposes of these plots the voltages have been adjusted so that that the pullout torques are the same. From left to right, the various speeds are 5% maximum frequency denoted by reference numeral 102; 25% maximum frequency denoted by reference 104; 50% maximum frequency denoted by reference 106; 75% maximum frequency denoted by reference 108; and 100% maximum frequency denoted by reference 110. The plots are illustrated with motor torque as measured by percentage of pull-out torque along the y-axis and motor speed as a percentage of no-load speed along the x-axis.

Referring to plot 110, the maximum pullout torque occurs at the peak of the plot (e.g., at 100% pullout torque). Maximum operating torque for purposes of this plot was arbitrarily selected to be 67% of maximum pullout torque. The leading edge of the curve is the far right portion of the curve for each plot 102-110.

As can be seen from FIG. 4, the plots 102-110 have the same general shape along the leading edge for generic motion provider. It is noted that at 100% maximum frequency 110, the slip variation is about 2% as compared between the no-load and maximum operating load. At lower frequencies, the slip speed is the same for 110, but the slip ratio form it's no load speed is substantially higher than 2%. Thus, as the frequency increases, the slip variation decreases. Thus, a plurality of induction motors can be run from a single control bus that utilizes a Volts per Hertz control model and each of the induction motors will operate within a desired slip variation (e.g., 2% slip variation) between no load and a maximum operating load.

Figure 5:
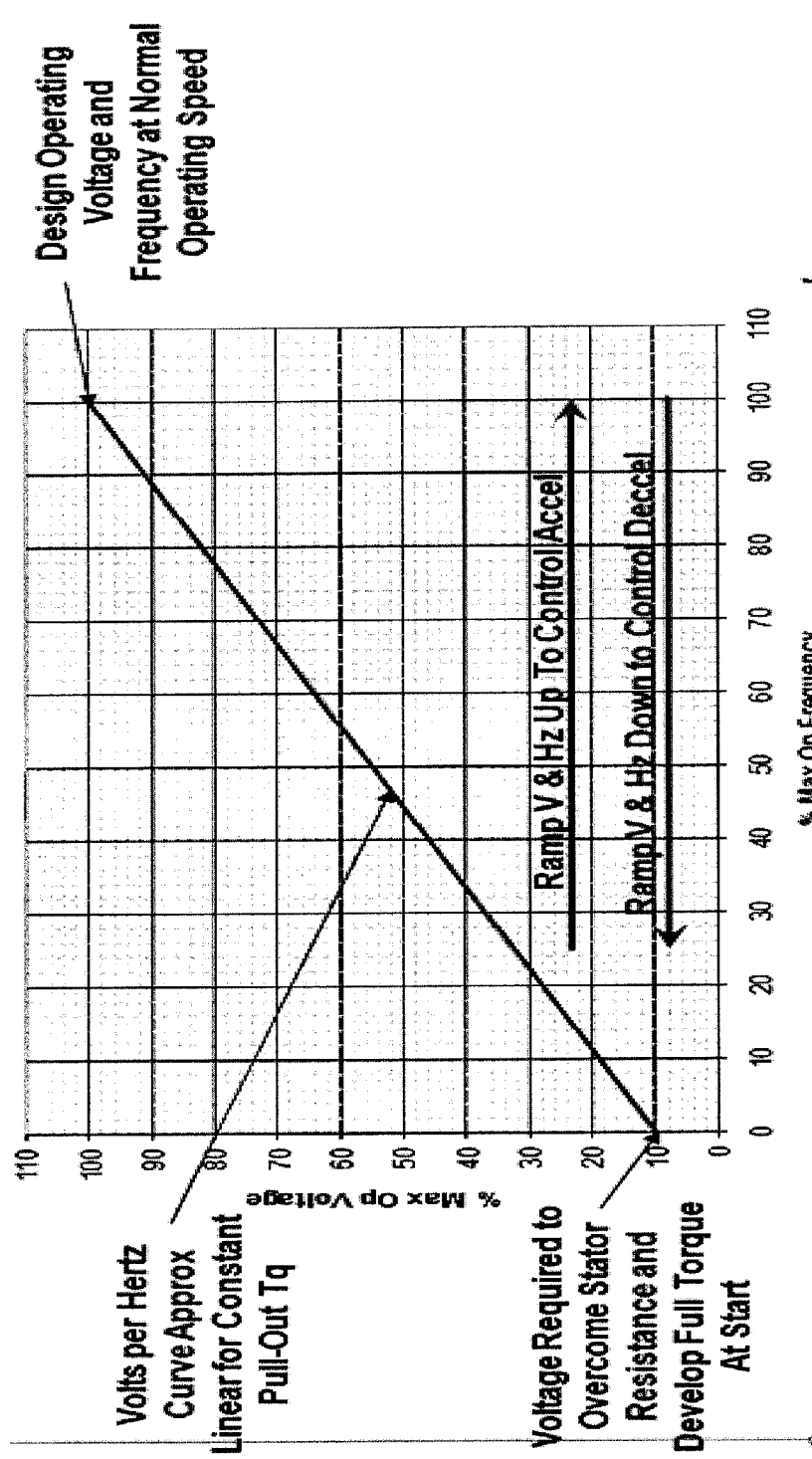
FIG. 5 is an exemplary graph illustrating a relationship between voltage and frequency in an open volts per Hertz control system in accordance with aspects of the present invention.

Referring to FIG. 5, an exemplary Volts per Hertz Control curve is illustrated. Generally, the controllers 32, 34 make use of a controlled sine wave drive output (e.g., a three phase sine wave). The controllers 32, 34 include an inverter that operates similar to a sine wave drive brushless DC (BLDC) motor. A BLDC is a synchronous electric motor powered by direct-current (DC) electricity and having an electronic commutation system, rather than a mechanical commutator and brushes. In BLDC motors, current to torque and voltage to rpm are linear relationships. The inverter is similar to a BLDC in the sense that the controllers control the voltage internally; AC frequency is controlled internally relative to motor speed; current is a function of voltage and motor torque; no commutation sensors are required; and detent positions are triggered by skew sensors.

As illustrated in FIG. 5, at zero frequency and some number of Volts (e.g., illustrated as 10% of maximum of operating voltage), which will be dependent on specific design of motor driving, a voltage offset associated with the specific motor design must be applied to overcome resistive losses in the motor. As ramp frequency and voltage are increased, current is effectively driven through inductive couples in the motor, thus producing torque. From the offset voltage and zero frequency to the maximum operating voltage and frequency in which the motor is designed to run at normal operating speeds, a substantially linear relationship is observed between voltage and frequency, as illustrated in FIG. 5.

It is further noted in FIG. 5, that in order to accelerate the motor, voltage and frequency may be ramped upward (e.g., increased) to control acceleration in the motor. Likewise, to decelerate the motor, voltage and frequency may be ramped downward (e.g., lowered) to decelerate the motor. Thus, the speed of an induction motor may be controlled by varying the frequency of the 3-phase supply. However, in order to maintain a constant pullout torque capability, the applied voltage must also be changed in relation to the frequency. Such relationship is commonly known as Volts per Hertz control. Above rated speed, the applied voltage is usually kept constant at the rated value (e.g., constant horse power). At low frequencies (e.g., lower operating speeds), the voltage must be increased in order to compensate for the effects of the stator resistance, as discussed above and illustrated in FIG. 5. It should be noted that the Volts per Hertz control law may be modified to provide specific variations in the motor output performance capability as required.

Based on the performance characteristics illustrated in FIGS. 4 and 5, it has been shown that a variable speed low slip motor (e.g., an induction motor) operating at fast enough operating frequencies (e.g., where the motors exhibit a desirable low operating slip ratio within a desired operating load range), a plurality of motors can be run from a common bus that is controlled by a single Volts per Hertz controller. In contrast, if the motors were operating at a low operating frequency, the slip rate would be significantly higher. Accordingly, the performance of motors coupled to a common bus would vary widely, which is undesirable.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

What is claimed is:

1. A control system for controlling a plurality of actuators, the system comprising:

a plurality of actuators for actuating movement of one or more adjustable components of an aircraft, wherein each actuator has a first end coupled to a structure of the aircraft and a second end coupled to one of the one or more adjustable components and each actuator additionally includes a motion control assembly that includes a drive path from a motion provider to the one adjustable component, wherein the one or more components is configured to move along a respective drive path; and a single power module controller operable to simultaneously output motor drive power from a single power module through a common electrical bus to at least two of the plurality of the motion providers in a synchronous manner to actuate movement of the one or more adjustable components.

2. The system of claim 1, wherein each motion provider is an induction motor.

3. The system of claim 2, wherein the induction motor is controlled by the controller to operate on a low slip side of a pull out point on a performance curve.

4. The system of claim 1, wherein the controller utilizes a Volts per Hertz open loop control.

5. The system of claim 4, wherein the Volts per Hertz open loop control utilizes voltage and frequency to control the motion providers.

6. The system of claim 1, wherein the controller sends a command to re-synchronize each actuator every retract cycle by driving each actuator into a calibrated retract stop at a controlled speed and torque capability.

7. The system of claim 6, wherein the controller controls the output of each of the actuators and the output is maintained near synchronous over the applied load range within a slip error of the motion provider characterized between a no-load and an operating point maximum load.

8. The system of claim 1, wherein at least one actuator includes a no-back mechanism for preventing the applied load from backdriving the actuator.

9. The system of claim 1, wherein at least one actuator includes an independent brake to prevent motion when not commanded.

10. The system of claim 1, wherein at least one actuator includes an adjustable stop along the drive path.

11. The system of claim 1, wherein at least one actuator includes a mechanical overload protection device.

12. The system of claim 11, wherein the mechanical overload protection devices is one selected from a group of a slip clutch and a load limiter.

13. The system of claim 1, wherein a pair of the plurality of actuators are coupled to one adjustable component.

14. The system of claim 13, wherein another pair of the plurality of actuators are coupled to a different one of the adjustable components.

15. The system of claim 11, wherein the controller outputs controlled motor drive power to the pair of actuators and another pair of actuators in a synchronous manner to actuate movement of the common component and the another common component.

16. The system of claim 15, wherein the common component is one selected from the group consisting of: a flap, a slat, a spoiler, an aileron and an elevator.

17. The system in claim 1, wherein each motion provider is a stepper motor.

18. The system in claim 17, further including a single stepper motor controller for providing controlled open loop stepper motor drive power to the stepper motor.

19. The system in claim 1 where each motion provider is a switched reluctance motor (SRM).

20. The system in claim 19, further including a single SRM motor controller for providing controlled open loop SRM motor drive power to the SRM.

* * * * *